United States Patent
Carter et al.

(10) Patent No.: US 10,536,419 B2
(45) Date of Patent: *Jan. 14, 2020

(54) SEARCHING AND DISPLAYING RELATED CONTENT TO A POST IN AN ACTIVITY STREAM

(71) Applicant: INTERNATIONAL BUSINESS MACHINES CORPORATION, Armonk, NY (US)

(72) Inventors: Bernadette A. Carter, Raleigh, NC (US); John Girata, Jr., Raleigh, NC (US); Derek Richard, San Francisco, CA (US); Joshua M. Small, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 444 days.

This patent is subject to a terminal disclaimer.

(21) Appl. No.: 15/490,348

(22) Filed: Apr. 18, 2017

(65) Prior Publication Data
US 2017/0222966 A1 Aug. 3, 2017

Related U.S. Application Data

(63) Continuation of application No. 14/471,557, filed on Aug. 28, 2014, now Pat. No. 9,721,022.

(51) Int. Cl.
*G06F 16/24* (2019.01)
*H04L 12/58* (2006.01)
(Continued)

(52) U.S. Cl.
CPC ............ *H04L 51/32* (2013.01); *G06F 3/0481* (2013.01); *G06F 16/248* (2019.01);
(Continued)

(58) Field of Classification Search
CPC ......... H04L 51/32; H04L 51/16; H04L 67/22; G06F 16/24568; G06F 16/955;
(Continued)

(56) References Cited

U.S. PATENT DOCUMENTS

| | | | |
|---|---|---|---|
| 8,095,613 B1 * | 1/2012 | Perkowitz ............ | G06Q 10/109 709/207 |
| 2007/0061299 A1 * | 3/2007 | Chisaka ................. | H04H 60/72 |

(Continued)

OTHER PUBLICATIONS

International Business Machines Corporation, "List of IBM Patents or Patent Applications Treated as Related," submitted Apr. 18, 2017, 2 Pages.

(Continued)

*Primary Examiner* — Hares Jami
(74) *Attorney, Agent, or Firm* — L. Jeffrey Kelly

(57) ABSTRACT

A method for searching and displaying content related to a post in an activity stream may include presenting, by a processor, an activity stream to a user. The activity stream may include a plurality of posts. The method may also include detecting a user action with respect to a particular post of the plurality of posts and analyzing content of the particular post. The method may additionally include searching at least other posts in the activity stream of the user for related content to the particular post based on the analysis of the content of the particular post. The method may additionally include generating a list of posts including related content to the particular post in response to the search. The method may further include presenting the list of posts comprising the related content. The list of posts provide a history or context leading up to the particular post.

20 Claims, 5 Drawing Sheets

(51) Int. Cl.

| | | |
|---|---|---|
| *G06F 16/248* | (2019.01) | |
| *G06F 16/955* | (2019.01) | |
| *G06F 16/9535* | (2019.01) | |
| *G06F 16/2452* | (2019.01) | |
| *G06F 16/2455* | (2019.01) | |
| *G06F 16/2457* | (2019.01) | |
| *G06F 3/0481* | (2013.01) | |
| *G06F 17/27* | (2006.01) | |
| *H04L 29/08* | (2006.01) | |

(52) U.S. Cl.
CPC .. *G06F 16/24522* (2019.01); *G06F 16/24568* (2019.01); *G06F 16/24575* (2019.01); *G06F 16/955* (2019.01); *G06F 16/9535* (2019.01); *G06F 17/2765* (2013.01); *H04L 51/16* (2013.01); *H04L 67/22* (2013.01)

(58) Field of Classification Search
CPC ......... G06F 16/24522; G06F 16/24575; G06F 16/9535; G06F 16/248; G06F 16/0481; G06F 17/2765
USPC ..................... 707/722, 727, 728, 732, 758
See application file for complete search history.

(56) References Cited

U.S. PATENT DOCUMENTS

| | | | | |
|---|---|---|---|---|
| 2007/0244975 | A1* | 10/2007 | Dillon | G06Q 10/107 709/206 |
| 2009/0319518 | A1* | 12/2009 | Koudas | G06F 16/951 |
| 2011/0173570 | A1 | 7/2011 | Moromisato et al. | |
| 2011/0179020 | A1 | 7/2011 | Ozzie et al. | |
| 2011/0320543 | A1* | 12/2011 | Bendel | G06F 17/2229 709/206 |
| 2012/0005224 | A1* | 1/2012 | Ahrens | H04W 4/21 707/769 |
| 2012/0324003 | A1* | 12/2012 | Armstrong | G06Q 10/107 709/204 |
| 2013/0066876 | A1 | 3/2013 | Raskino et al. | |
| 2013/0097173 | A1* | 4/2013 | Stovicek | G06F 3/04883 707/741 |
| 2014/0256292 | A1* | 9/2014 | Son | H04W 4/14 455/412.1 |

OTHER PUBLICATIONS

LinkedIn, "LinkedIn Signal Demonstrates the Power of Role-Based Activity Stream Filters," Sep. 29, 2010, donwloaded from <http://lehawes.wordpress.com/2010/09/29/1inkedin-signal-demonstrates-the-power-of-role-based-activity-stream-filters/> on Jun. 12, 2014, pp. 1-4.
IBM, "Gaining full value from survey text," IBM Corporation, 2010, IBM Software Business Analytics, pp. 1-12.
Refinder, "Managing Activity Streams," Feb. 16, 2012, downloaded from <http://www.getrefinder.com/about/blog/2012/02/16/managing-activity-streams> on Jun. 12, 2014, pp. 1-3.
Google Plus Daily, "The Updated Google+ Hashtag System," downloaded from <http://www.googleplusdaily.com/2013/06/the-updated-google-hashtag-system.html> on Aug. 21, 2014, pp. 1-7.
IBM, "SPSS Text Analytics for Surveys," IBM Software, downloaded from <http://www-03.ibm.com/software/products/en/spss-text-analytics-surveys> on Aug. 19, 2014, pp. 1-2.
Wikipedia, "Natural Language Processing," downloaded from <http://en.wikipedia.org/wiki/Naturalianguage-processing> on Jul. 8, 2014, pp. 1-11.
Sitrion, "Enterprise Collaboration PlatformIHR Self-Services," downloaded from <http://www.sitrion.com/> on Aug. 27, 2014, pp. 1-3.
Google, "How to use hashtags on Google+," downloaded from <https://support.google.com/plus/answer/3120322> on Aug. 19, 2014, pp. 1-3.
IBM, "SPSS Statistics," IBM Software Business Analytics, downloaded from <http://www-01.ibm.com/software/analytics/spss/products/statistics/> on Aug. 19, 2014, pp. 1-2.
Arpit Gupta, "A Method and System for Displaying Information based on a User's Activity", IP.com, IPCOM000202800D, Jan. 3, 2011, Yahoo.
U.S. Appl. No. 14/471,557, filed Aug. 28, 2014, Pending.

* cited by examiner

SEARCHING AND DISPLAYING RELATED CONTENT TO A POST IN AN ACTIVITY STREAM

CROSS-REFERENCE TO RELATED APPLICATIONS

This application is a continuation application of U.S. patent application Ser. No. 14/471,557, filed Aug. 28, 2014, the contents of which are incorporated herein by reference in its entirety.

BACKGROUND

Aspects of the present invention relate to social networks, online mail clients and the like, and more particularly to a method, system and computer program product for searching and displaying related content to a post in an activity stream.

Online social networks are a universal mechanism to connect people and information in logical and organized ways which enable sharing and processing of information between the members of the social network. Common mechanisms for sharing and processing information on online social networks may include, but are not necessarily limited to, a wall or virtual wall where a user or member of the social network can post messages for other users or members; an activity stream which may be a list of messages or posts received by a user or member and may also include a list of messages or posts sent by the user or member; a timeline that may chronologically list a series of events, and profiles of users or members that can be accessed for information about a particular user or member. These mechanisms enable users or members to rapidly share information with others and gather information from others in the network. However, finding and presenting related posts can be difficult. Activity streams present posts to the user in chronological order. Therefore, related posts often do not appear together in the activity stream. When the user views a new post, the user may be confused or not understand the context of the post because the user cannot recall information displayed in an earlier post, or the user may not have seen the earlier post at all. To fill in this missing information for complete understanding or awareness of the new or current post, the user has to manually perform searches and/or filter posts by date, category or possibly some other arrangement if the user has even established some arrangement for organizing posts. This technique of finding possible related information or posts may have additional shortcomings, such as the user not being able to display the information in context, redundant information may be displayed, and the user is not able to see chronologically what may have resulted in the new post.

BRIEF SUMMARY

According to one aspect of the present invention, a method for searching and displaying content related to a post in an activity stream may include presenting, by a processor, an activity stream to a user. The activity stream may include a plurality of posts. The method may also include detecting a user action with respect to a particular post of the plurality of posts and analyzing content of the particular post. The method may additionally include searching at least other posts in the activity stream of the user for related content to the particular post based on the analysis of the content of the particular post. The method may additionally include generating a list of posts including related content to the particular post in response to the search. The method may further include presenting the list of posts comprising the related content. The list of posts provides a history or context leading up to the particular post.

According to another aspect of the present invention, a system for searching and displaying content related to a post in an activity stream may include a processor and a module operating on the processor for searching for and displaying content related to a post in an activity stream. The module may be configured to perform a set of functions including presenting an activity stream to a user. The activity stream may include a plurality of posts. The module may also be configured to perform the function of the set of functions including detecting a user selecting a post of the plurality of posts and analyzing content of the selected post. The module may also perform the function of searching at least other posts in the activity stream of the user for related content to the selected post based on the analysis of the content of the selected post. The module may be configured to also perform the functions including generating a list of posts comprising related content to the selected post in response to the search and presenting the list of posts including the related content. The list of posts provides a history or context leading up to the particular post.

According to another aspect of the present invention, a computer program product for searching and displaying content related to a post in an activity stream may include a computer readable storage medium having program instructions embodied therewith, wherein the computer readable storage medium is not a transitory medium per se. The program instructions may be executable by a device to cause the device to perform a method that may include presenting an activity stream to a user. The activity stream may include a plurality of posts. The method may also include detecting a user selecting a post of the plurality of posts and analyzing content of the selected post. The method may additionally include searching at least other posts in the activity stream of the user for related content to the selected post based on the analysis of the content of the selected post. The method may further include generating a list of posts comprising related content to the selected post in response to the search and presenting the list of posts including the related content. The list of posts provides a history or context leading up to the particular post.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
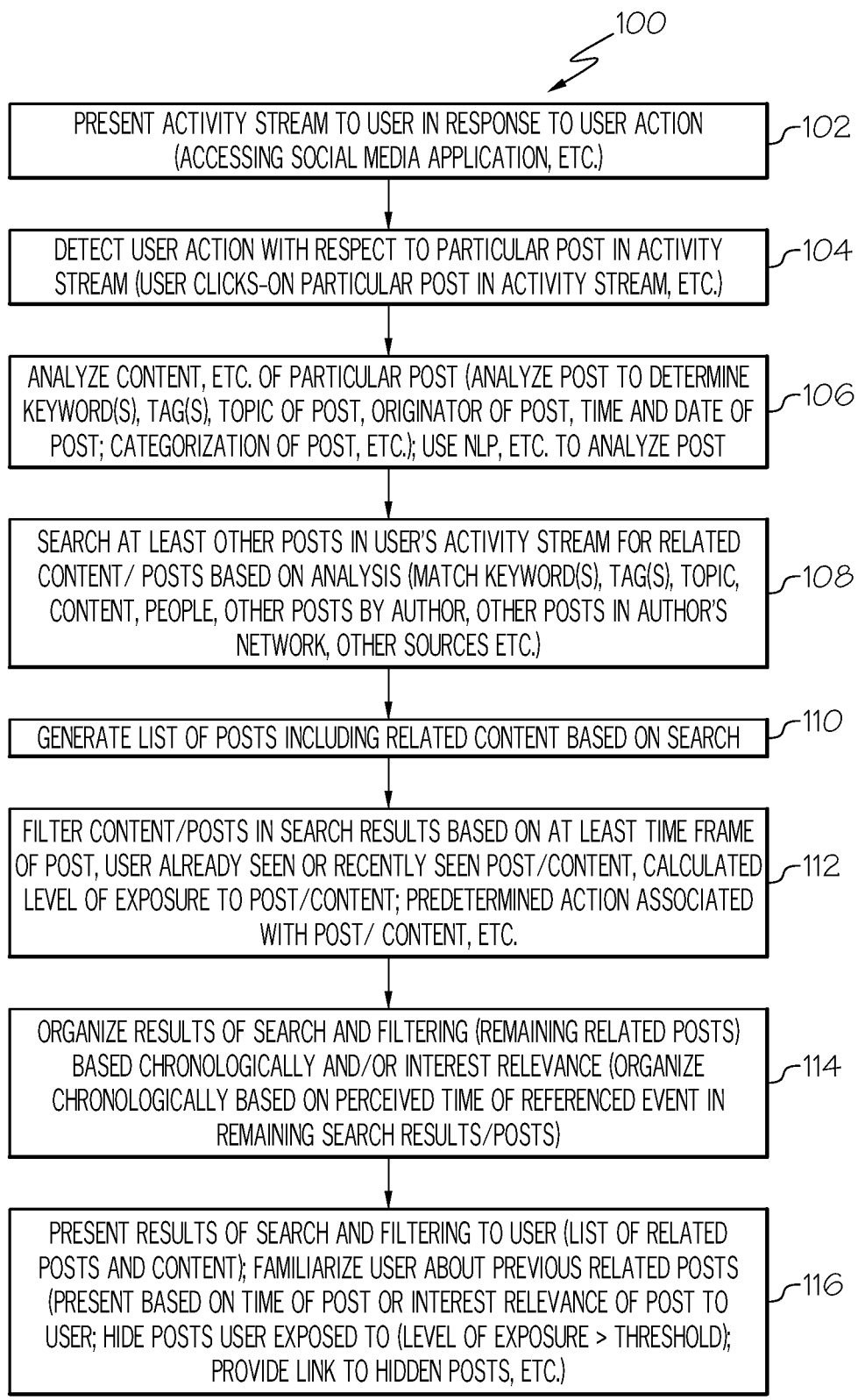
FIG. 1 is a flow chart of an example of a method for searching and displaying related content to a post in an activity stream in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 is a flow chart of an example of a method 100 for searching and displaying related content to a post in an activity stream in accordance with an embodiment of the present invention. In block 102, an activity stream may be presented to a user in response to an action by the user. For example the user may access, enable, open or run a social media application or other application that presents the activity stream. The activity stream may include a plurality of posts. As used herein, a post or message may refer to any type of communications by a user or participant in an online social network or other network using any type of communications application operating on any type of communications device. For example, a post may be a message in an activity stream including a series of messages or communications between users or participants in an online social network. Examples of online social networks which may enable activity streams may include but is not necessarily limited to MySpace, Facebook, IBM Connections, and LinkedIn. MySpace is a trademark in the United States, other countries or both of MySpace LLC. Facebook is a trademark in the United States, other countries or both of Facebook, Inc. IBM Connections is a trademark in the United States, other countries or both of International Business Machines Corporation. LinkedIn is a trademark in the United States, other countries or both of LinkedIn Ltd.

In block 104, a user action may be detected with respect to a particular post in the activity stream. For example, the user may select a particular post in the activity stream by clicking-on the particular post using a computer pointing device, such as a mouse, selecting the particular post using another input device, such as the keys on a keyboard, or perform some other action to select the particular post.

In block 106, content of the particular post or post selected by the user may be analyzed. Analyzing the particular post may include but is not necessarily limited to at least one of determining a keyword or keywords, a tag or tags, a topic of the particular post, and originator of the post, a time and date of the post, a categorization of the post if the post is associated with a particular category, class or type of post, such as whether the post originated from a friend, an expert or may be classified or categorized as a popular post.

Some of the terms that can represent a particular post may be self-evident as they can be stored and represented as their own explicit data types. Such terms may not be created as specific extensions of the data posts contained in a social network setting. The terms may be recognizable across software applications and may be intuitively interpreted by humans. Examples of such terms may include but are not limited to the date and time of a post, any keywords represented as subsets of the textual content found throughout a post or other terms that may be self-evident as representing a particular post.

Other terms that may include more detail may be a tag or tags associated with a post which may be in a section of extra metadata associated with a post. The post may be represented with as few words as possible for each tag and may involve a human summarization of a main content of the post in an effort to better categorize the post amongst other posts or other forms of data. The topic of a post may be an explicit title if a title is provided, or an interpreted concept not directly recorded into data form but determined by the reader of the post by summarizing content in brief sentence form. The originator of the post may be the authorized user that submitted content to the social network at a particular time using their account. A category may be implemented in a stricter sense to singly file a post in a certain category that has meaning, as opposed to tags that may allow a post to be filed into multiple psuedo-categories. Categories may allow the user to infer less about the content of the post and more about the type of the post, showing that the ways the post may be filed do not have overlapping categories.

A post may originate from a friend if the originator is in the "friends list" or "network" of the user that is reading the post. The originator of a post may be classified as an expert when the post's content is identified as belonging to a particular field of knowledge that the system has determined through various criteria the originator has command over, or the submitted information by the originator may be considered highly-valued over that of others. As a non-limiting example, this criteria may be that the expert has submitted a lot of content related to this knowledge area, or that his posts may appear to be widely "popular" or received and reviewed by a certain number of users or member of the network. Popularity may be determined by several criteria, some of which may be that the content is recognized by other highly-valued or regarded members of the social network and recognized by a large volume or certain number of other users as having a particular expertise or knowledge base.

The particular post or selected post may be analyzed using natural language processing (NLP) or other text or language processing to determine or identify keywords, tags, topics, etc. This processing may occur over any available, explicit or determined, textual content of a post. This process aims to, given the total content, categorize the relevant parts of the content into structured categories for a determinant system to use later on when evaluating the post.

In block 108, at least other posts in the user's activity stream may be searched for related content based on the analysis of the content of the particular post or selected post. For example, keywords, tags, topics, identification of certain people or other content from the analysis may be matched to the content of other posts in the user's activity stream or in other sources. Examples of other sources may include but is not necessarily limited posts in activity streams or networks of others, such as the author or originator of the particular post, posts by friends, posts by experts, popular posts, email of the user, social network activity of the user, a web browsing history of the user or other sources that may contain related content.

In block 110, a list of posts including related content based on the search may be generated. The list of posts may also include related content from other sources. An identification of the other source and the associated related content may be included in the list of posts.

In block 112, the list of posts and related content in the search results may be filtered. The list of posts resulting from the search may be filtered based on one or more criteria. Examples of criteria for filtering the list of posts and/or other related content from other sources may include but are not necessarily limited to the same timeframe of the listed post, such as posts occurring during the same timeframe, a determination if the user has already seen or recently seen the particular post and/or the related content, a level of exposure by the user to the related content, a predetermined action associated with the related content or post by the user. For example, posts for related content which are older than a preset time frame may be filtered from the list of posts and related content. Posts which the user may have responded to may also be filtered. An example of a method for controlling the searching, filtering and presenting the list of posts and related content will be described in more detail with reference to FIG. 2.

Determining a level of exposure by the user to the related content may be based on certain criteria that may be related to how the user viewed the specific post before. For example, the criteria may involve when the post was originally shown to the user, either as a main post the user was reading or as a related post, and for how long the user had the post on the screen by reading it.

In block 114, the results of the search for related content and filtering of the search results or list of posts of related content including other sources of related content may be organized. For example, the remaining list of posts of related content may be organized chronologically and/or based on an interest relevance to the user. The remaining list of posts after filtering may be organized chronologically based on a perceived time of an event referenced in the remaining search results or posts. If the time of the event cannot be determined, the time of the post may be used for listing the post. The ordering may be ascending or descending chronological order based on user preference. Organizing the remaining list of posts based on an interest relevance to the user may include rank ordering the list of posts based on a predetermined ranking or priority assigned to particular topics, keywords or tags that are matched, particular categories or classes of posts, identification of people or other parameter. Other mechanisms for organizing the list of posts may also be used.

In block 116, the results of the search and filtering may be presented to the user. Accordingly, the remaining list of related posts and associated content which may include related content from other sources, such as those previously described, may be presented to the user. The list of posts provides a history or context leading up to the particular post. The list of posts and related content is intended to provide a more complete understanding of the post selected by the user. For example, the list of posts may provide a stream of content from inception of a particular topic to the time of the selected post to bring the user up to date or familiarize the user about previous posts and/or other activity of the user, such as e-mail communications, browser history, or the like. An example of an activity stream and presentation of a list of posts including related content to a selected post in an activity stream in accordance with an embodiment of the present invention will be described with reference to FIG. 4.

Figure 2:
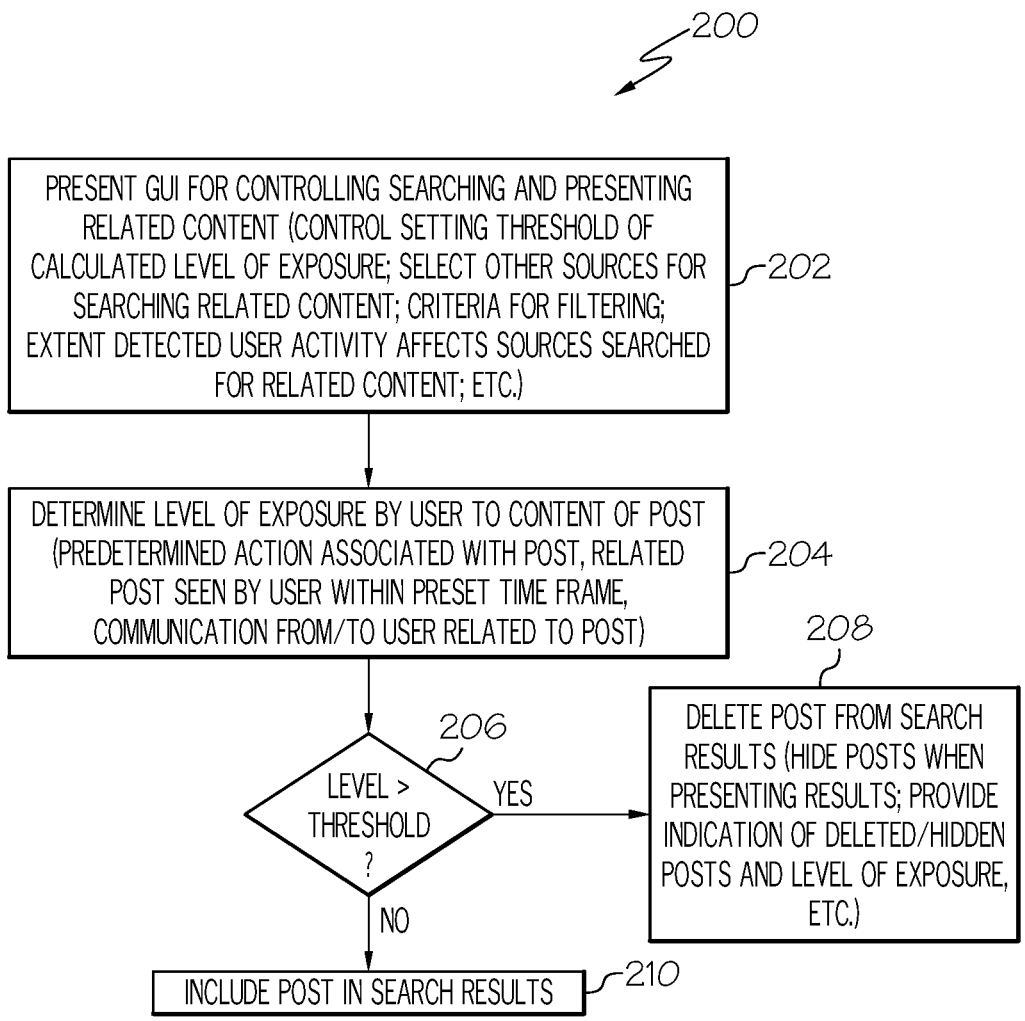
FIG. 2 is flow chart of an example of a method for filtering related content to a post in an activity stream based on a level of exposure to a user in accordance with an embodiment of the present invention.

FIG. 2 is flow chart of an example of a method 200 for filtering a list of posts of related content based on a level of exposure to a user in accordance with an embodiment of the present invention. The method 200 may be embodied in block 112 or may be part of the functions performed in block 112 of FIG. 1. In block 202, a graphical user interface (GUI) may be presented to the user. The GUI may include features for controlling the searching, filtering and presentation of posts including related content to a particular post in an activity stream selected by a user similar to that previously described. The features in the GUI may be selected or specified prior to the method 100 being performed. An example of a GUI for controlling the searching, filtering and presentation of a list of posts including related content in accordance with an embodiment of the present invention will be described with reference to FIG. 3 below.

In block 204, a level of exposure by the user to the content of the selected post may be determined. Determining a level of exposure by the user to the content of a post may include but is not necessarily limited to a predetermined action by the user associated with the post, related posts that have been seen by the user within a preset time frame, and communications from or to the user related to the post or content of the post. An example of a predetermined action by the user associated with the post or content of the post may include additional posts by the user related to the content or commenting about the content of the post. As previously described, determining the level of exposure by the user to the content of the post may be based on matching at least a portion of the content of the selected post to at least one of another post, an email associated with the user that references the content or a portion of the content of the selected post, social network activity of the user, a web browsing history of the user or other user activity related to the content or portion of the content of the post.

In block 206, a determination may be made if the level of exposure by the user to the content of a post in the list of posts exceeds a preset threshold. If the level of exposure exceeds the preset threshold, the method 200 may advance to block 208. In block 208, the post may be deleted from the search results or list of posts in accordance with at least one embodiment of the invention. In accordance with another embodiment, if the level of exposure of the related content of the post in the list of posts exceeds the preset threshold, the post may be hidden from view when the list of posts are presented. An indication of the hidden post may be presented in the list of posts. The indication may be an icon or placeholder in the list of posts or some other indication. The indication may either be a general icon for all hidden posts, or it can be a limited representation of the specific post being hidden, meant to signify that user exposure to the post was high. The calculated level of exposure may also be presented with the indication of the hidden post. The indication of the hidden post may also include a link to the hidden post. The user may then activate the link or click-on the indication of the hidden post to access or display the hidden post. One example of a scenario in which a post may be hidden may be a post including a link to an article on a website because the user has already bookmarked or "liked" the article on the website since the article was created. Another exemplary scenario in which a post may be hidden may be a post that includes a status update, such as, "just pitched abc to exec A" because a record exists that the user has discussed abc with person "A" in the social software system. A further scenario where the post may be hidden in the list of posts may be a status update, such as "just made deal selling 100k seats of abc", because the user has already read an email from management that references 100k seats of abc being sold.

If the level of exposure does not exceed the preset threshold in block 206, the method 200 may advance to block 210. In block 210, the post and associated content may be included in the search results or list of posts including the content related to the content of the selected post in the user's activity stream.

Figure 3:
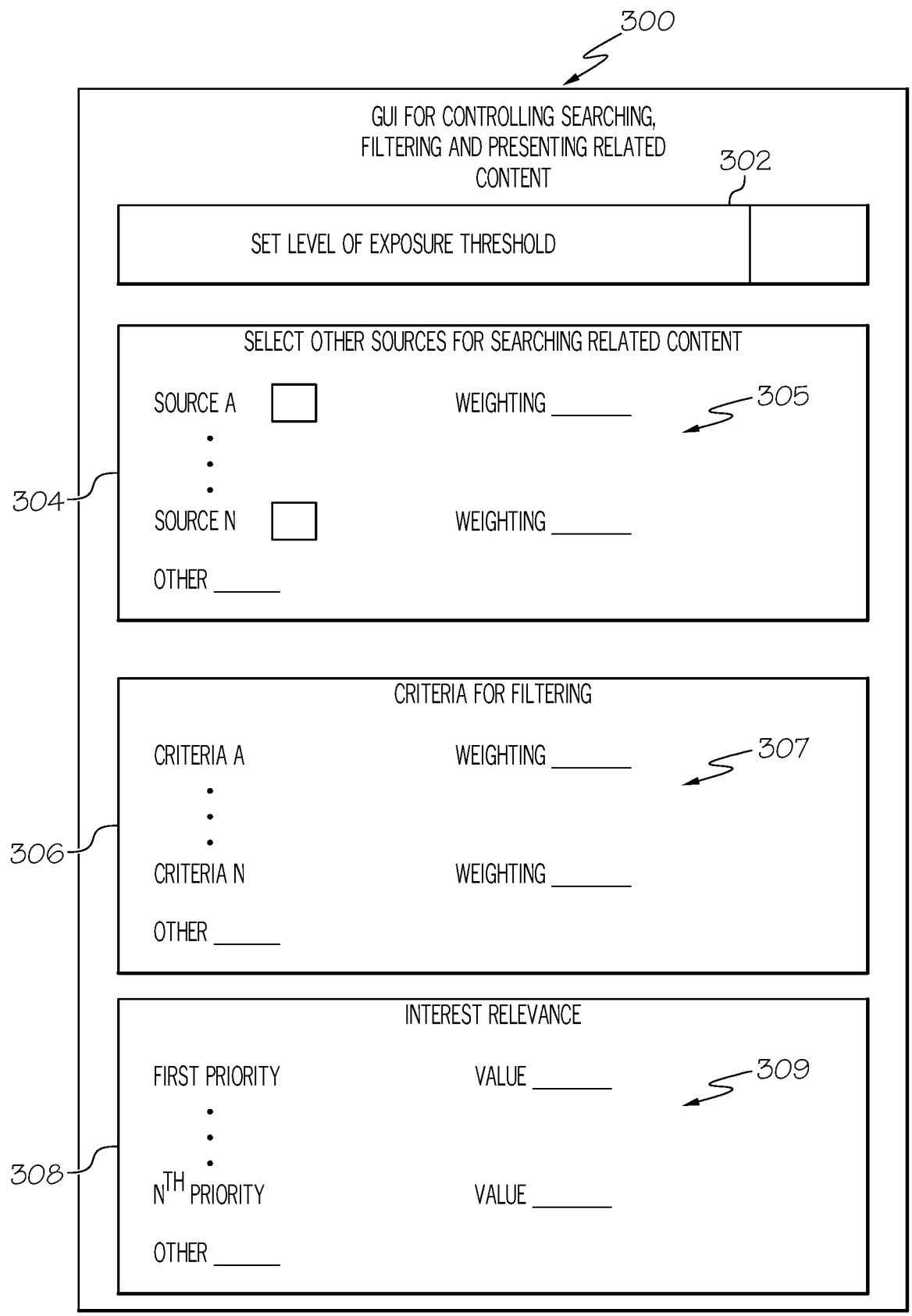
FIG. 3 is an example of a graphical user interface for controlling searching, filtering and presenting the related content in accordance with an embodiment of the present invention.

FIG. 3 is an example of a GUI 300 including features for controlling the searching, filtering and presentation of the related content or posts including related content in accordance with an embodiment of the present invention. The GUI 300 may include a feature 302 configured for setting a threshold value of the level of exposure by the user to related content in other posts or other sources as described herein. The threshold value may be the threshold used in block 206 of FIG. 2. Accordingly, the threshold value may be preset by the user. In another example, this threshold may appear as several values or settings, having a threshold or weight associated with each field in this form.

The GUI 300 may also include a feature 304 configured for selecting other sources that may be searched for related content. Examples of other sources that may be searched for related content in addition to the users activity stream may include but is not necessarily limited to e-mails associated with the user, social network activity of the user, activity streams of other users in a social network, an activity stream of an originator of the selected post in the user's activity stream, a web browsing history of the user, etc. A setting or weighting 305 may also be selected or set for each source based on a level of importance of the source, priority of the source or other characteristic associated with the source. The user may also specify other sources and set a weighting or priority.

The GUI 300 may additionally include a feature 306 configured for defining or selecting criteria for filtering the list of posts including related content and other sources of related content to the post selected in the user's activity stream. The criteria for filtering may be similar to that previously described, for example, determining a level of exposure of the user to the content, a time frame of the post, and any other criteria that may result in deemphasizing a particular post or related content. A setting or weighting 307 may also be selected or set for each criteria. The GUI 300 may further include a feature 308 configured for specifying an interest relevance for rank ordering or prioritizing the list of posts similar to that previously described. A value 309 or percentage may be set for association with each interest relevance. For each section of the GUI 300 that a user may select from a list of entries, the user may also be able to specify additional entries concerning, but not limited to, other sources of content, criteria, and relevant interests.

Figure 4:
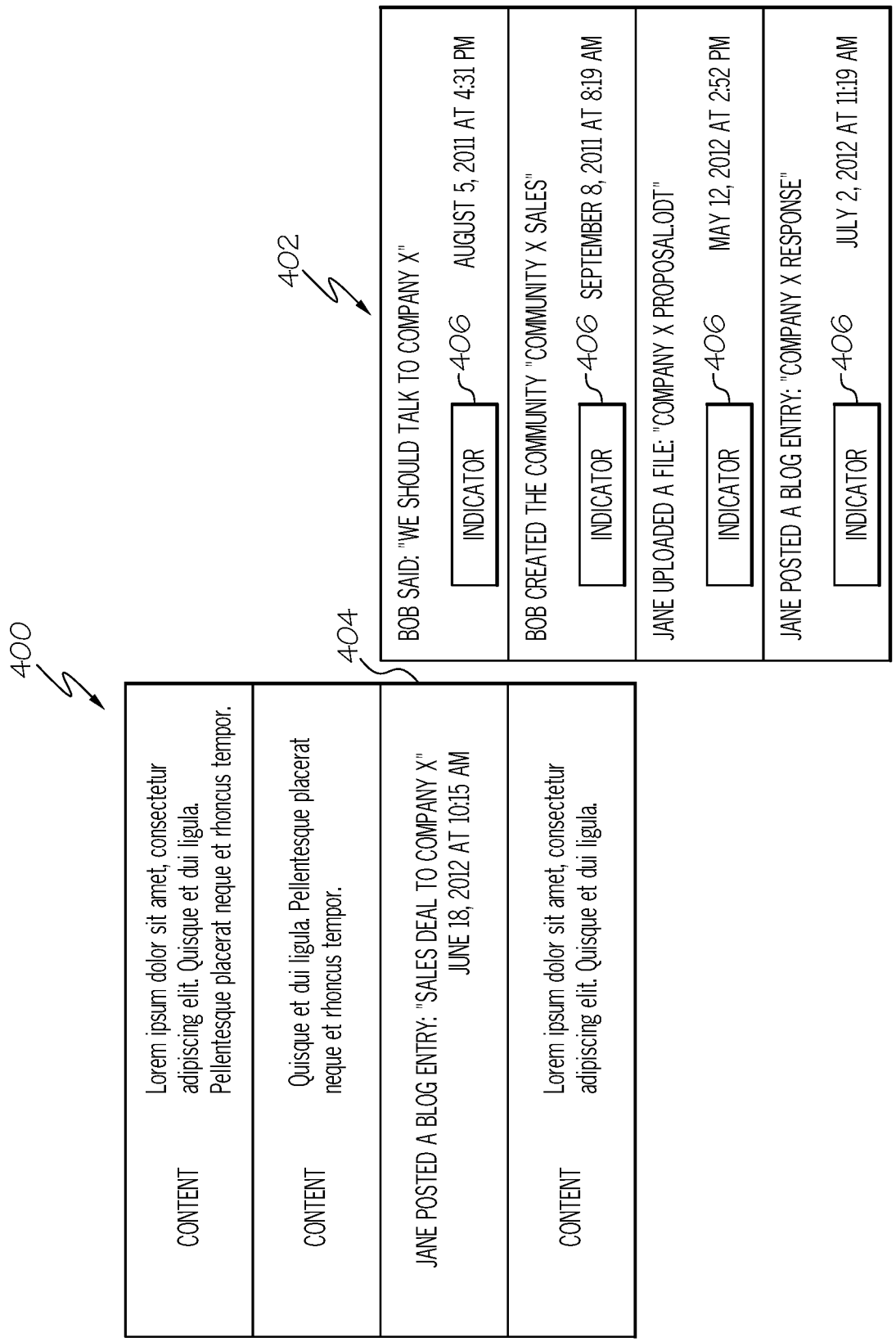
FIG. 4 is an example of an activity stream and presentation of a list of posts including related content to a selected post in the activity stream in accordance with an embodiment of the present invention.

FIG. 4 is an example of an activity stream 400 and presentation of a list of posts 402 including related content to a selected post 404 in the activity stream in accordance with an embodiment of the present invention. The list of posts 402 may be generated by performing the searching and filtering operations previously described with reference to the exemplary methods 100 and 200 in FIGS. 1 and 2 respectively. As illustrated in the example of FIG. 4 the list of posts 402 may be presented in a separate view from the activity stream 400 of the user. Similar to that previously described, the list of posts 402 of related content may be presented in response to the user selecting or "clicking-on" the particular post 404 using a computer pointing device, such as a mouse or other pointing device. Each post 402 the list of related posts may also include an indicator 406 of how or why each post 402 was eventually included, possibly by related content, as an expert reference, or other reason why the post is included.

Figure 5:
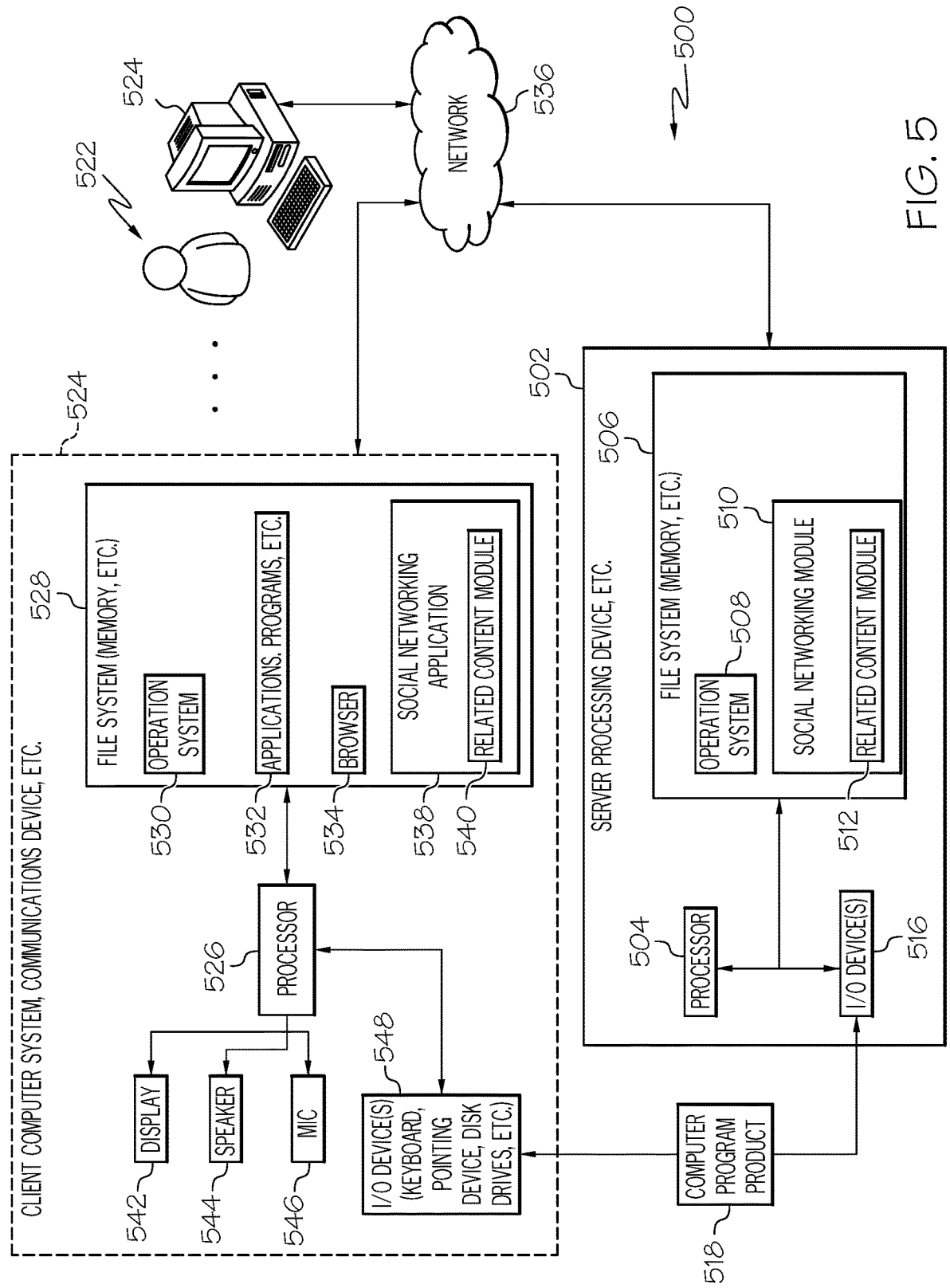
FIG. 5 is a block schematic diagram of an example of a system configured for searching and displaying related content to a post in an activity stream in accordance with an embodiment of the present invention.

FIG. 5 is a block schematic diagram of an example of a system 500 configured for searching, filtering and displaying related content to a selected post in an activity stream in accordance with an embodiment of the present invention. The method 100 of FIG. 1 and method 200 of FIG. 2 may be embodied in and performed by the system 500. The system 500 may include a processing device 502. The processing device 502 may be a server or similar processing device. The processing device 502 may include a processor 504 for controlling operation of the processing device 502 and for performing functions, such as those described herein with respect to searching, filtering and presenting posts including related content to a selected post in a user's activity stream. The processing device 502 may also include a file system 506 or memory. An operating system 508, applications and other programs may be stored on the file system 506 for running or operating on the processor 504. A social networking module 510 or system may also be stored on the file system 506 and may be compiled and run on the processor 504 to perform the functions for conducting online communications or activity streams between users similar to that described herein. The social networking module 510 may be any type of online communications mechanism for online communications or conversations. The methods 100 and 200 of FIGS. 1 and 2 respectively may be embodied in the social networking module 510 and performed by the processor 504 when the social networking module 510 is compiled and run on the processor 504.

The social networking module 510 may include a related content module 512. Similar to that previously described, the related content module 512 may be configured to search for related content to content in a selected post in a user's activity stream, filter a resulting list of posts including related content and present the filtered list of posts similar to that described with reference to the methods 100 and 200 in FIGS. 1 and 2. In another embodiment, the related content module 512 may be separate from the social networking module 510 and operate in coordination with the social network module 510 to perform the operations described herein.

The processing device 502 may also include one or more input devices, output devices or combination input/output devices, collectively I/O devices 516. The I/O devices 516 may include, but are not necessarily limited to, a keyboard or keypad, pointing device, such as a mouse, disk drive and any other devices to permit a user to interface with and control operation of the processing device 502 and to access the social networking module 510 or system. At least one of the I/O devices 516 may be a device to read a computer program product, such as computer program product 518. The computer program product 518 may be similar to that described in more detail herein. The social networking module 510 may be loaded on the file system 506 from a computer program product, such as computer program product 518.

A member of a social network or user 522 of the system 500 for social networking may use a computer system 524 or communications device to access the processing device 502 or server and social networking module 510 or system. The computer system 524 or communications device may be any sort of communications device including a mobile or handheld computer or communications device. The computer system 524 may include a processor 526 to control operation of the computer system 524 and a file system 528, memory or similar data storage device. An operating system 530, applications 532 and other programs may be stored on the file system 528 for running or operating on the processor 526. A web or Internet browser 534 may also be stored on the file system 528 for accessing the processing device 502 or server via a network 536. The network 536 may be the Internet, an intranet or other private or proprietary network.

In accordance with an embodiment, a social networking application 538, feature or module may also be stored on the file system 528 and operate on the processor 526 of the user's computer system 524. The social networking application 538 may any sort of online communications mechanism, such as a social networking or social media application, electronic mail client or email application, or other application for online communications or conversations capable of performing the functions and operations described herein. The social networking application 538 may include a related content module 540 for searching, filtering and presenting posts including related content to a selected post in the user's activity stream similar to that described herein. In another embodiment, the related content module 540 may be a separate module from the social networking application 538 and operate in cooperation with the social networking application 538 to perform the functions described herein. The social networking application 538 operating on the computer system 524 may interface with or operate in conjunction with the social networking module 510 or system on the processing device 502 or server to perform the functions and operations described herein for searching, filtering and presenting posts including related content to a selected post in the user's activity stream. Accordingly, social networking application 538 operating on the computer system 524 may perform some of the functions and operations of the methods 100 and 200 and social networking module 510 operating on the server 502 may perform other functions of the methods 100 and 200. Some embodiments of the present invention may include only the social networking module 510 and related content module 512 on the processing device 502 or server, and other embodiments may include only the social networking application 538 and related content module 540 on the client computer system 524 or communications device.

The computer system 524 may also include a display 542, a speaker system 544, and a microphone 546 for voice communications. One or more user interfaces may be presented on the display 542 for controlling operating the social networking module 510 and social networking application 538 and for performing the operations and functions described herein. For example, the GUI 300 may be presented to a user for controlling the searching, filtering and presentation of related content similar to that previously described.

The computer system 524 may also include one or more input devices, output devices or combination input/output devices, collectively I/O devices 548. The I/O devices 548 may include a keyboard or keypad, pointing device, such as a mouse, disk drives and any other devices to permit a user, such as user 522, to interface with and control operation of the computer system 524 and to access the social networking application 538 and social networking module or system 510 on server 402. The I/O devices 548 may also include at least one device configured to read computer code from a computer program product, such as computer program product 518.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention.

The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for searching and displaying content related to a post in an activity stream, comprising:
    analyzing, by a processor, content of a particular post in the activity stream in response to selection of the particular post by a user;
    searching, by the processor, at least other posts in the activity stream of the user for related content to the particular post based on the analysis of the content of the particular post;
    generating, by the processor, a list of posts comprising related content to the particular post in response to the search;
    filtering, by the processor, the list of posts based at least on a level of exposure by the user to the related content;
    determining, by the processor, the level of exposure by the user to the related content based on matching at least a portion of the content of the particular post to at least one of another post, email associated with the user, social network activity associated the user, and a web browsing history of the user; and
    presenting, by the processor, the list of posts comprising the related content, the list of posts providing a history or context leading up to the particular post to the user.

2. The method of claim 1, wherein analyzing the content of the particular post comprises performing at least natural language processing to determine a keyword from the content of the particular post and wherein searching at least the other posts in the activity stream of the user comprises matching the keyword to content in at least the other posts in the activity stream of the user.

3. The method of claim 1, wherein analyzing the content of the particular post comprises identifying at least one of a keyword, a tag, a topic of the particular post, and an originator of the particular post.

4. The method of claim 3, further comprising identifying related content to the particular post by matching at least one of the keyword, the tag, the topic of the particular post and the originator of the particular post in at least other posts in the activity stream of the user.

5. The method of claim 3, further comprising identifying related content to the particular post by matching at least one of the keyword, the tag, the topic of the particular post and the originator of the particular post in at least other posts in the activity stream of the user, other posts by the originator of the particular post, posts by friends, posts by experts and popular posts.

6. The method of claim 1, further comprising filtering the list of posts based at least on a time frame of each post of the list posts.

7. The method of claim 1, wherein presenting the list of posts comprises hiding any post of the list of posts comprising a level of exposure greater than a preset threshold value.

8. The method of claim 7, further comprising presenting a graphical user interface that allows the user to set, adjust and modify the preset threshold value for the level of exposure, the graphical user interface further comprising a feature for specifying parameters for controlling searching, filtering and presenting the list of posts.

9. The method of claim 1, further comprising assigning a level of exposure threshold based on identifying an exposure of the related content by the user based on searching emails associated with the user, social activity associated the user and a web browsing history of the user.

10. The method of claim 1, wherein searching at least other posts in the activity stream of the user comprises searching for the related content in other sources, wherein other sources comprise a website, an online news source, a forum, a social network, and a corpus of knowledge.

11. The method of claim 1, wherein presenting the list of posts comprising the related content comprises presenting the list of posts in a view combined or separate from the activity stream of the user.

12. The method of claim 1, wherein presenting the list of posts comprises presenting the list of posts in chronological order.

13. The method of claim 1, further comprising providing a GUI including a feature configured for rank ordering or prioritizing the list of posts.

14. The method of claim 13, wherein presenting the list of post comprises presenting the list of posts based on an interest relevance to the user.

15. The method of claim 1, wherein presenting the list of posts comprises:
hiding any post of the list of posts comprising a level of exposure greater than a preset threshold value; and
providing an indication of any hidden post.

16. The method of claim 15, further comprising providing a link to the hidden post.

17. A method for searching and displaying content related to a post in an activity stream, comprising:
detecting, by a processor, selection of a particular post of a plurality of posts by a user;
analyzing, by the processor, content of the particular post in the activity stream in response to selection of the particular post by the user;
searching, by the processor, at least other posts in the activity stream of the user for related content to the particular post based on the analysis of the content of the particular post;
generating, by the processor, a list of posts comprising related content to the particular post in response to the search;
determining, by the processor, a level of exposure by the user to the related content based on matching at least a portion of the content of the particular post to at least one of another post, email associated with the user, social network activity associated the user, and a web browsing history of the user;
filtering, by the processor, the list of posts based at least on the level of exposure by the user to the related content; and
presenting, by the processor, the list of posts comprising the related content, the list of posts providing a history or context leading up to the particular post to the user.

18. The method of claim 17, further comprising identifying related content to the particular post by matching at least one of the keyword, the tag, the topic of the particular post and the originator of the particular post in at least other posts in the activity stream of the user, other posts by the originator of the particular post, posts by friends, posts by experts and popular posts.

19. A method for searching and displaying content related to a post in an activity stream, comprising:
presenting, by a processor, an activity stream to a user, the activity stream comprising a plurality of posts;
detecting, by the processor, selection of a particular post of the plurality of posts by user;
analyzing, by the processor, content of the particular post in the activity stream in response to selection of the particular post by the user;
searching, by the processor, at least other posts in the activity stream of the user for related content to the particular post based on the analysis of the content of the particular post;
generating, by the processor, a list of posts comprising related content to the particular post in response to the search;
assigning a level of exposure threshold based on identifying an exposure of the related content by the user based on searching emails associated with the user, social activity associated the user and a web browsing history of the user;
filtering, by the processor, the list of posts based the level of exposure by the user to the related content; and
presenting, by the processor, the list of posts comprising the related content, the list of posts providing a history or context leading up to the particular post to the user.

20. The method of claim 19, further comprising determining the level of exposure by the user to the related content based on matching at least a portion of the content of the particular post to at least one of another post, email associated with the user, social network activity associated the user, and a web browsing history of the user.

* * * * *